(12) United States Patent
Lai et al.

(10) Patent No.: US 9,477,054 B2
(45) Date of Patent: Oct. 25, 2016

(54) OPTICAL COUPLING ASSEMBLY

(71) Applicant: HON HAI PRECISION INDUSTRY CO., LTD., New Taipei (TW)

(72) Inventors: Chih-Chen Lai, New Taipei (TW); I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 171 days.

(21) Appl. No.: 14/546,400

(22) Filed: Nov. 18, 2014

(65) Prior Publication Data
US 2015/0153222 A1    Jun. 4, 2015

(30) Foreign Application Priority Data
Nov. 30, 2013    (CN) .......................... 2013 1 0623068

(51) Int. Cl.
*G01J 1/04*    (2006.01)
*G02B 6/42*    (2006.01)

(52) U.S. Cl.
CPC ............. *G02B 6/423* (2013.01); *G02B 6/4214* (2013.01)

(58) Field of Classification Search
CPC ... G02B 6/423; G02B 6/4214; G01J 1/0403; G01J 1/42
USPC ............................................ 250/227.24, 239
See application file for complete search history.

(56) References Cited

U.S. PATENT DOCUMENTS

| | | | |
|---|---|---|---|
| 6,838,689 B1 * | 1/2005 | Deng ................... | G02B 6/4224 250/239 |
| 7,511,258 B2 * | 3/2009 | Bowen ................. | G02B 6/3636 250/216 |
| 2004/0178329 A1 * | 9/2004 | Kare ..................... | G01J 1/0425 250/227.11 |

* cited by examiner

Primary Examiner — Seung C Sohn
(74) Attorney, Agent, or Firm — Zhigang Ma

(57) ABSTRACT

An optical coupling assembly includes a circuit board, at least one light emitter, at least one light receiver, and an optical coupling module. The circuit board includes a mounting surface and an alignment groove formed on the mounting surface. The at least one light emitter and at least one light receiver are mounted on the mounting surface. The optical coupling module includes at least two lenses and a positioning member. The positioning member is engaged with the alignment groove, with each of the at least one light emitter and the at least one light receiver being optically aligned with a respective one of the at least two first lenses.

9 Claims, 5 Drawing Sheets

OPTICAL COUPLING ASSEMBLY

FIELD

The subject matter herein generally relates to fiber optic communications.

BACKGROUND

In the field of fiber optic communications, an optical coupling assembly often includes a circuit board having a light emitter (receiver), and an optical coupling module having a coupling lens, for coupling and transmission of optical signals. Transmission quality of the optical signals is determined by the accuracy of the alignment between the light emitter (receiver) and the coupling lens.

BRIEF DESCRIPTION OF THE DRAWINGS

Implementations of the present technology will now be described, by way of example only, with reference to the attached figures.

DETAILED DESCRIPTION

Figure 1:
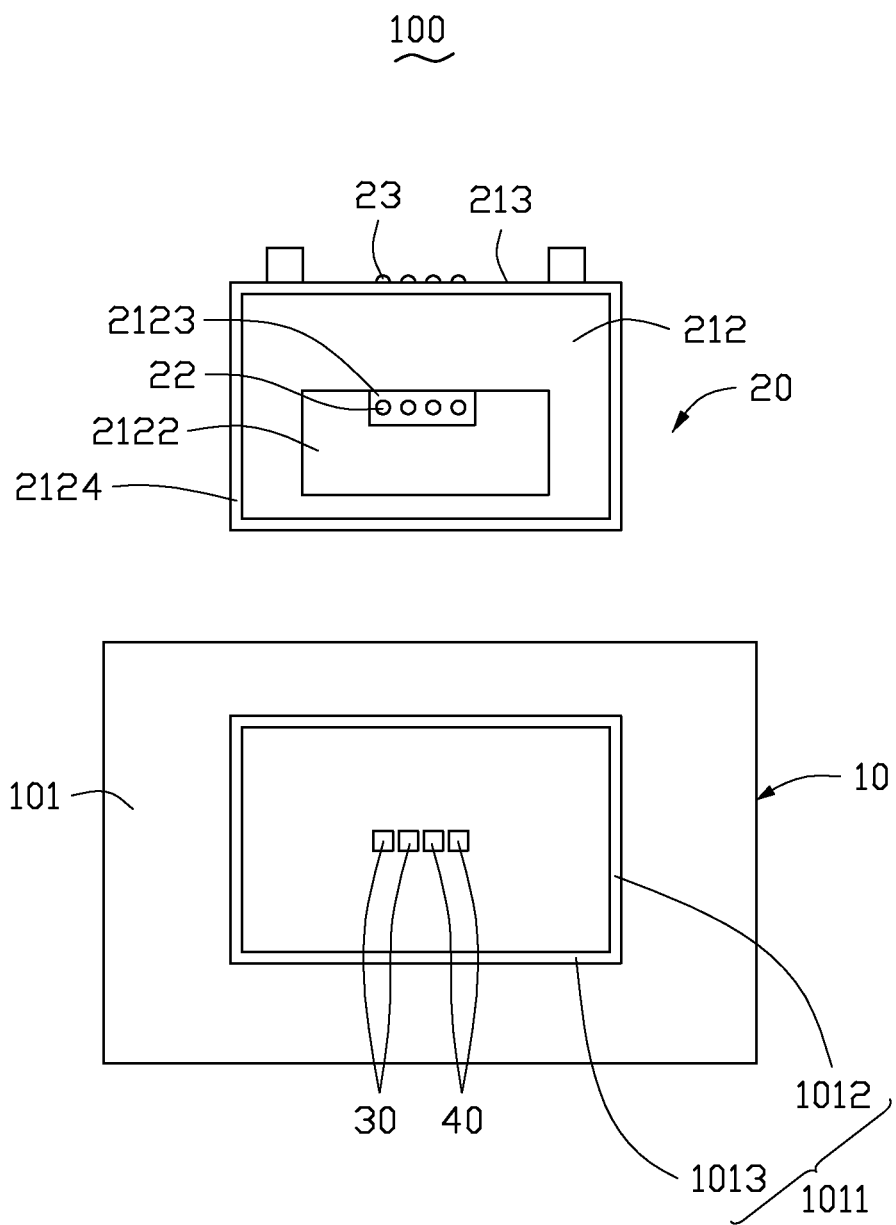
FIG. 1 is an exploded, diagrammatic view of an optical coupling assembly which includes a positioning member, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 2:
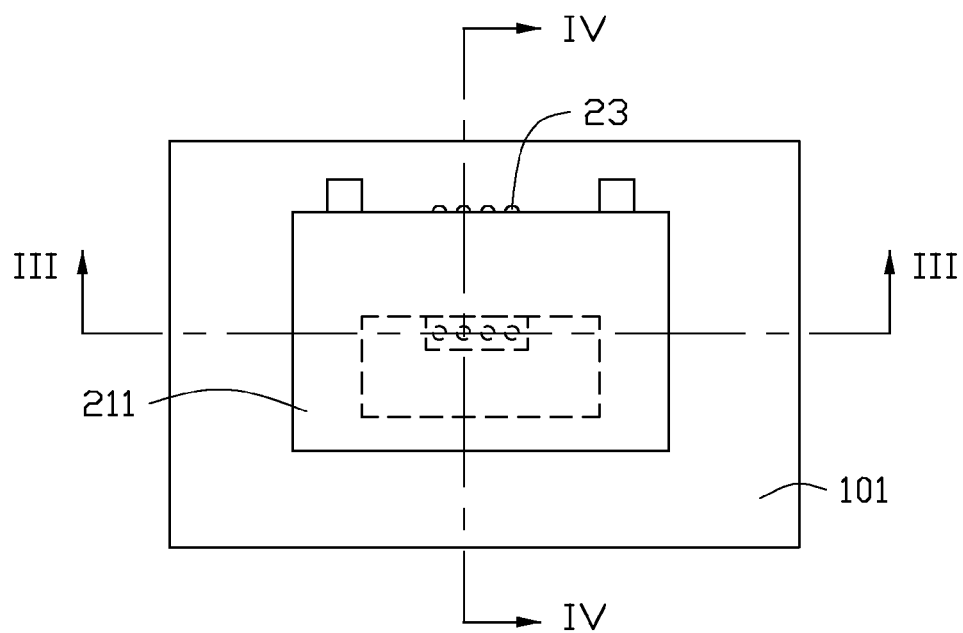
FIG. 2 is a top diagrammatic view of the optical coupling assembly of FIG. 1, when the optical coupling assembly is assembled.
Figure 4:
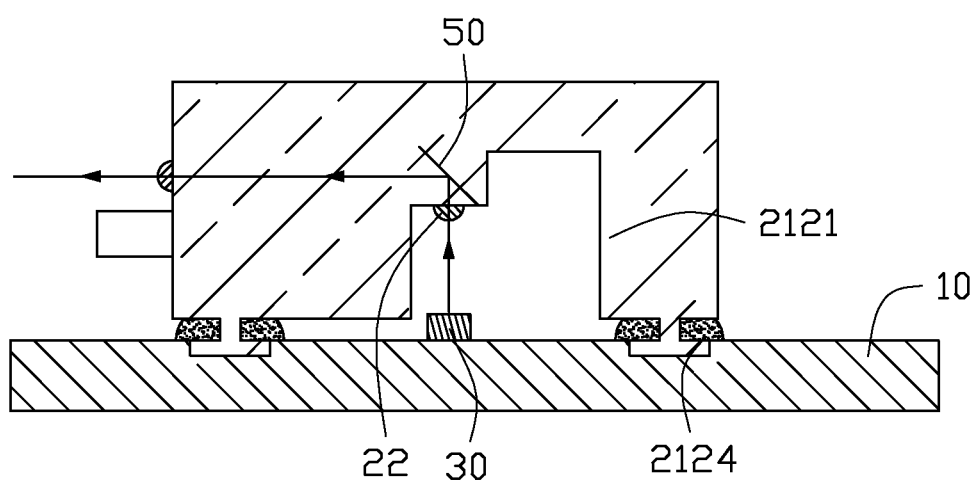
FIG. 4 is a cross-sectional view of the optical coupling assembly of FIG. 2, taken along line IV-IV.

FIGS. 1-2 illustrate an optical coupling assembly 100. The optical connector 100 includes a circuit board 10, an optical coupling module 20, at least one light emitter 30, at least one light receiver 40, and at least two reflecting elements 50 (as shown in FIG. 4). FIG. 1 is an exploded, diagrammatic view of the optical coupling assembly 100. FIG. 2 is a top diagrammatic view of the optical coupling assembly 100, when the optical coupling assembly 100 is assembled.

The circuit board 10 includes a mounting surface 101. The at least one light emitter 30 and the at least one light receiver 40 are mounted on the mounting surface 101 and electrically connected with the circuit board 10. The at least one light emitter 30 and the at least one light receiver 40 are distributed in a line. In the embodiment, the number of the light emitters 30 and the light receivers 40 are two. Each light emitter 30 is a laser diode (LD) for emitting light beams. Each light receiver 40 is a photodiode (PD) for receiving light beams. The mounting surface 101 defines an alignment groove 1011. In detail, the alignment groove 1011 comprises two first parallel groove portions 1012 and two second parallel groove portions 1013, the first groove portion 1012 and the second groove 1013 communicate with each other. The alignment groove 1011 surrounds the light emitters 30 and the light receivers 40. A cross plane of the alignment groove 1011 perpendicular to the mounting surface 101 is rectangular.

The optical coupling module 20 is made of transparent plastic and is substantially cubed. The optical coupling module 20 includes a main body 21 (not shown), at least two first lenses 22, and at least two second lenses 23. The main body 21 includes a top surface 211 (as shown in FIG. 3), a bottom surface 212 opposite to the top surface 211, and a side surface 213 perpendicularly connecting the top surface 211 and the bottom surface 212.

Figure 3:
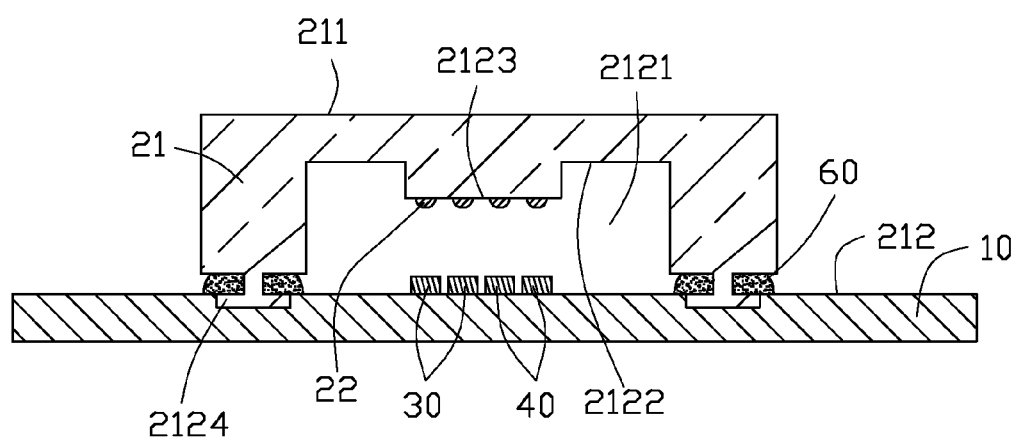
FIG. 3 is a cross-sectional view of the optical coupling assembly of FIG. 2, taken along line III-III.

The bottom surface 212 defines a substantially rectangular recess 2121 (as shown in FIG. 3); the bottom surface 212 further includes a positioning member 2124 extending away from the bottom surface 212 along a periphery surrounding the recess 2121, (shown in FIGS. 3 and 4). The recess 2121 includes a lower surface 2122 parallel to the bottom surface 212. A rectangular block 2123 extends up from the lower surface 2122. The first lenses 22 extend up from the block 2123 toward the bottom surface 212. In the embodiment, the number of the first lenses 22 is four and the four first lenses 22 are distributed in a line. Each first lenses 22 is a convex lens.

Figure 5:
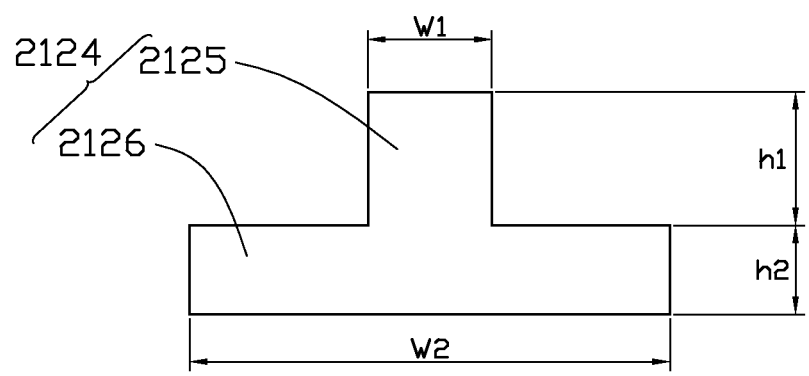
FIG. 5 is a sectional diagrammatic view of the positioning member taken along line IV-IV of FIG. 2.

The positioning member 2124 is substantially inverted and includes a first supporting portion 2125 and a second supporting portion 2126 perpendicularly connected with the first supporting portion 2125, a width of the second supporting portion 2126 is larger than a width of the first supporting portion 2125, (shown in FIG. 4 and FIG. 5). In this illustrated embodiment, a width w1 of the first supporting member 2125 is in a range from about $0.5 \times 10^3$ um to $1.5 \times 10^3$ um. A width w2 of the second supporting member 2125 is in a range: $1.5 \times 10^3 < w2 < 4.5 \times 10^3$ um. A height h1 of the first supporting portion 2125 is approximately equal to a height h2 of the second supporting portion 2126, a height of the first supporting member 2125 is in a range from about 25 to 250 um. In this illustrated embodiment, a depth of the alignment groove 1011 is approximately equal to a height of the second supporting member 2126. The alignment groove 1011 of the circuit board 10 is configured to be engaged with the second supporting member 2125 of the optical coupling module 20. In the embodiment, when the alignment groove 1011 of the circuit board 10 is engaged with the second supporting member 2125 of the optical coupling module 20, each of the light emitters 30 and the light receivers 40 is aligned with a respective first lens 22. In the embodiment, the two light emitters 30 are aligned with two of the first lenses 22, the two light receivers 40 are aligned with the other two first lenses 22.

The at least two second lenses 23 extend up from the side surface 213. In the embodiment, the number of the second lenses 23 is four and the four second lenses 23 are distributed in a line. Each second lenses 23 is a convex lens. An optical axis of each first lens 22 and an optical axis of a respective one of the second lens 23 are orthogonal to each other.

The number of the at least two reflecting elements 50 is four. Each reflecting element 50 is positioned between a light path between each first lens 22 and a respective second lens 23. The optical axis of each first lens 22 and the optical axis of a respective second lenses 23 intersect at a respective reflecting element 50. Each reflecting element 50 is configured to reflect light beams from each first lens 22 to a respective second lens 23 or reflect light beams from each second lens 23 to a respective first lens 22.

When in assembly of the optical coupling module 20 to the circuit board 10, an adhesive 60 is filled in the alignment groove 1011 first, then the second supporting member 2125 is received in the alignment groove 1011 of the circuit board 10, the adhesive 60 overflows from the alignment groove 1011, and surrounds the second supporting portion 2126 and the near bottom surface 212 of the second supporting portion 2126 under the action of gravity. As such, the optical coupling module 10 is mounted on the circuit board 10 enclosing the light emitters 30 and the light receivers 40. Each of the light emitters 30 and the light receivers 40 is aligned with a respective first lens 22. In use, each light emitter 30 emits a first light beam. The first light beam projects into the optical coupling module 20 through a respective first lens 22, then reflects to a respective second lens 23, and finally emits out from the optical coupling module 20 through the respective second lens 23. A second light beam projects into the optical coupling module 20 through a respective second lens 23. The second light beam is reflected to a respective first lens 22, and emits out from the optical coupling module 20 through the respective first lens 22, and finally projects to a respective light receiver 30.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including, the full extent established by the broad general meaning of the terms used in the claims. It will therefore be appreciated that the embodiments described above may be modified within the scope of the claims.

What is claimed is:

1. An optical coupling assembly comprising:
    a circuit board comprising a mounting surface and defining an alignment groove on the mounting surface;
    at least one light emitter mounted on the mounting surface;
    at least one light receiver mounted on the mounting surface; and
    an optical coupling module mounted on the circuit board and enclosing the at least one light emitter and the at least one light receiver therein, the optical coupling module comprising a bottom surface, at least two first lenses arranged on the bottom surface and a positioning member arranged on the bottom surface;
    wherein the positioning member comprises a first supporting portion and a second supporting portion perpendicularly connected with the first supporting portion, a width of the second supporting portion is larger than a width of the first supporting portion; and
    wherein the positioning member of the optical coupling module is engaged with the alignment groove of the circuit board, with each of the at least one light emitter and the at least one light receiver being optically aligned with a respective one of the at least two first lenses.

2. The optical coupling assembly of claim 1, wherein a cross section of the positioning member is substantially inverted.

3. The optical coupling assembly of claim 1, wherein the alignment groove comprises two first parallel groove portions and two second parallel groove portions, the first groove portion and the second groove are communicated with each other, the alignment groove surrounds the at least one light emitter and at least one light receiver, and the second supporting portion is received in the alignment groove.

4. The optical coupling assembly of claim 3, wherein the positioning member is a closed rib extends away from the bottom surface along a periphery of the bottom surface.

5. The optical coupling assembly of claim 4, wherein the bottom surface defines a substantially rectangular recess, the recess comprises a lower surface parallel to the bottom surface, a cuboid block extends up from the lower surface toward the bottom surface, the at least two first lenses extend up from the block.

6. The optical coupling assembly of claim 4, wherein the optical coupling module further comprises a side surface perpendicularly connected to the bottom surface and at least two second lenses extending from the side surface, an optical axis of each first lens and an optical axis of each second lens are orthogonal to each other.

7. The optical coupling assembly of claim 6, wherein the optical coupling assembly includes two light emitters, two light receivers, four first lenses, and four second lenses.

8. The optical coupling assembly of claim 1, wherein each light emitter is a laser diode, and each light receiver is a photodiode.

9. The optical coupling assembly of claim 1, wherein an adhesive is utilized on the second supporting portion, and the adhesive covers the second supporting portion.

* * * * *